US008151341B1

(12) United States Patent
Gudov et al.

(10) Patent No.: US 8,151,341 B1
(45) Date of Patent: Apr. 3, 2012

(54) SYSTEM AND METHOD FOR REDUCING FALSE POSITIVES DURING DETECTION OF NETWORK ATTACKS

(75) Inventors: Nikolay V. Gudov, Moscow (RU); Dmitry A. Levashov, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/113,223

(22) Filed: May 23, 2011

(51) Int. Cl.
*H04L 29/06* (2006.01)

(52) U.S. Cl. .................... 726/13; 726/23; 726/25

(58) Field of Classification Search ............ 726/13, 726/22, 23, 24, 25
See application file for complete search history.

(56) References Cited

U.S. PATENT DOCUMENTS

| | | | | |
|---|---|---|---|---|
| 5,781,729 A * | 7/1998 | Baker et al. | ................ | 709/230 |
| 6,266,700 B1 * | 7/2001 | Baker et al. | ................ | 709/230 |
| 6,321,338 B1 * | 11/2001 | Porras et al. | ................ | 726/25 |
| 6,510,509 B1 * | 1/2003 | Chopra et al. | ................ | 712/13 |
| 6,611,875 B1 * | 8/2003 | Chopra et al. | ................ | 709/245 |
| 6,708,212 B2 * | 3/2004 | Porras et al. | ................ | 709/224 |
| 6,944,673 B2 * | 9/2005 | Malan et al. | ................ | 709/237 |
| 7,032,031 B2 * | 4/2006 | Jungck et al. | ................ | 709/246 |
| 7,058,015 B1 | 6/2006 | Wetherall et al. | | |
| 7,272,854 B2 | 9/2007 | Marceau et al. | | |
| 7,426,634 B2 | 9/2008 | Jain | | |
| 7,525,921 B1 * | 4/2009 | Yi Dar Lo | ................ | 370/241 |
| 7,570,663 B2 * | 8/2009 | Jungck | ................ | 370/498 |
| 7,607,170 B2 * | 10/2009 | Chesla | ................ | 726/22 |
| 7,610,375 B2 * | 10/2009 | Portolani et al. | ................ | 709/224 |
| 7,624,447 B1 * | 11/2009 | Horowitz et al. | ................ | 726/23 |
| 7,626,940 B2 | 12/2009 | Jain | | |
| 7,640,589 B1 * | 12/2009 | Mashevsky et al. | ................ | 726/24 |
| 7,664,048 B1 * | 2/2010 | Yung et al. | ................ | 370/253 |
| 7,707,305 B2 * | 4/2010 | Afek et al. | ................ | 709/238 |
| 7,733,891 B2 * | 6/2010 | Reynolds et al. | ................ | 370/412 |
| 7,752,665 B1 * | 7/2010 | Robertson et al. | ................ | 726/23 |
| 7,836,496 B2 * | 11/2010 | Chesla et al. | ................ | 726/13 |
| 7,849,502 B1 * | 12/2010 | Bloch et al. | ................ | 726/11 |
| 7,849,507 B1 * | 12/2010 | Bloch et al. | ................ | 726/22 |
| 7,898,966 B1 * | 3/2011 | Yi Dar Lo | ................ | 370/241 |
| 7,979,368 B2 * | 7/2011 | Kapoor et al. | ................ | 706/20 |
| 8,010,469 B2 * | 8/2011 | Kapoor et al. | ................ | 706/20 |
| 8,042,171 B1 * | 10/2011 | Nordstrom et al. | ................ | 726/13 |
| 2002/0032717 A1 * | 3/2002 | Malan et al. | ................ | 709/105 |
| 2002/0032793 A1 * | 3/2002 | Malan et al. | ................ | 709/232 |

(Continued)

FOREIGN PATENT DOCUMENTS

EP          2109282 A1    10/2009

(Continued)

*Primary Examiner* — David Garcia Cervetti

(74) *Attorney, Agent, or Firm* — Arent Fox LLP; Michael Fainberg

(57) ABSTRACT

Disclosed are systems, methods and computer program products for reduction of false positives during detection of network attacks on a protected computer. In one example, the system comprises a proxy device configured to redirect and mirror traffic directed to the protected computer; a traffic sensor configured to collect statistical information about the mirrored traffic; a data collector configured to aggregate information collected by the traffic sensor and to generate traffic filtering rules based on the aggregated statistical information; a filtering center configured to, in parallel with collection of statistical information, filter redirected traffic based on the traffic filtering rules provided by the data collector; and a control module configured to collect and store statistical information about known network attacks and to correct traffic filtering rules used by the filtering center for purpose of reducing false positives during detection of network attacks on the protected computer.

20 Claims, 7 Drawing Sheets

U.S. PATENT DOCUMENTS

| | | | |
|---|---|---|---|
| 2003/0172289 A1 | 9/2003 | Soppera | |
| 2004/0064738 A1 | 4/2004 | Kanno et al. | |
| 2004/0250124 A1* | 12/2004 | Chesla et al. | 713/201 |
| 2004/0257999 A1* | 12/2004 | MacIsaac | 370/252 |
| 2005/0182950 A1* | 8/2005 | Son et al. | 713/189 |
| 2005/0216956 A1* | 9/2005 | Orr et al. | 726/23 |
| 2005/0257267 A1* | 11/2005 | Williams et al. | 726/25 |
| 2006/0029104 A1* | 2/2006 | Jungck | 370/498 |
| 2006/0095968 A1* | 5/2006 | Portolani et al. | 726/23 |
| 2006/0137009 A1* | 6/2006 | Chesla | 726/22 |
| 2006/0206935 A1 | 9/2006 | Choi et al. | |
| 2007/0056028 A1* | 3/2007 | Kay | 726/11 |
| 2007/0056029 A1* | 3/2007 | Kay | 726/11 |
| 2007/0056030 A1* | 3/2007 | Kay | 726/11 |
| 2007/0061433 A1* | 3/2007 | Reynolds et al. | 709/223 |
| 2007/0136809 A1 | 6/2007 | Kim et al. | |
| 2007/0159979 A1* | 7/2007 | Butler et al. | 370/244 |
| 2007/0198937 A1 | 8/2007 | Paris | |
| 2007/0218874 A1* | 9/2007 | Sinha et al. | 455/411 |
| 2007/0250930 A1* | 10/2007 | Aziz et al. | 726/24 |
| 2007/0258438 A1 | 11/2007 | Bennett | |
| 2008/0005782 A1* | 1/2008 | Aziz | 726/3 |
| 2008/0010247 A1 | 1/2008 | Boutboul | |
| 2008/0022405 A1 | 1/2008 | Wang et al. | |
| 2008/0031447 A1* | 2/2008 | Geshwind et al. | 380/46 |
| 2008/0034424 A1* | 2/2008 | Overcash et al. | 726/22 |
| 2008/0052774 A1* | 2/2008 | Chesla et al. | 726/13 |
| 2008/0086435 A1* | 4/2008 | Chesla | 706/12 |
| 2008/0098476 A1* | 4/2008 | Syversen | 726/23 |
| 2008/0133518 A1* | 6/2008 | Kapoor et al. | 707/6 |
| 2008/0196100 A1* | 8/2008 | Madhavan et al. | 726/22 |
| 2008/0201772 A1* | 8/2008 | Mondaeev et al. | 726/13 |
| 2008/0262991 A1* | 10/2008 | Kapoor et al. | 706/20 |
| 2009/0031244 A1 | 1/2009 | Brezina et al. | |
| 2009/0037592 A1 | 2/2009 | Lyon | |
| 2009/0089293 A1 | 4/2009 | Garritano et al. | |
| 2009/0287811 A1* | 11/2009 | Juhasz et al. | 709/224 |
| 2010/0138919 A1* | 6/2010 | Peng et al. | 726/22 |
| 2010/0154059 A1* | 6/2010 | McNamee et al. | 726/23 |
| 2010/0180331 A1* | 7/2010 | Murakami et al. | 726/11 |
| 2010/0281542 A1* | 11/2010 | Stolfo et al. | 726/23 |
| 2011/0214157 A1* | 9/2011 | Korsunsky et al. | 726/1 |
| 2011/0231510 A1* | 9/2011 | Korsunsky et al. | 709/213 |
| 2011/0231564 A1* | 9/2011 | Korsunsky et al. | 709/231 |
| 2011/0231936 A1* | 9/2011 | Williams et al. | 726/25 |
| 2011/0238855 A1* | 9/2011 | Korsunsky et al. | 709/231 |

FOREIGN PATENT DOCUMENTS

| | | |
|---|---|---|
| EP | 2109279 B1 | 5/2010 |
| KR | 20070077517 | 7/2007 |
| WO | 03003210 A2 | 1/2003 |
| WO | 2006039629 A2 | 4/2006 |

* cited by examiner

SYSTEM AND METHOD FOR REDUCING FALSE POSITIVES DURING DETECTION OF NETWORK ATTACKS

TECHNICAL FIELD

This present disclosure relates generally to the field of network security and, more specifically, to systems, methods and computer program products for reduction of false positives during detection of network attacks on a protected computer.

BACKGROUND

There exist a large number of threats to computers connected to the Internet. A denial-of-service (DoS) attack one example of such threats. A DoS attack is an attack on a computer system aimed at causing it to crash, i.e., to create conditions under which legitimate (rightful) system users cannot gain access to the resources (servers) provided by the system, or to make this access difficult. The motives for these attacks may vary—they may be elements of a competitive struggle, a means of fraud or retaliation, an expression of dissatisfaction, a demonstration of capabilities, or an attempt to attract attention, which is most often interpreted as cyber terrorism. An attack that is carried out simultaneously on a larger number of computers is called a Distributed Denial-of-Service (DDoS) attack. There are two kinds of DDoS attacks: bandwidth attacks and application attacks.

Bandwidth attacks are characterized by flooding of network communication channels with a large number of packets. Since network routers, servers and firewalls have limited processing resources, they may become inaccessible for processing legitimate transactions or crash under the overload during DDoS bandwidth attack, in which a large number of TCP, UDP or ICMP packets is sent to a specific network device or service.

Application attacks are characterized by exploitation of features of TCP, HTTP and other protocols, and the behavior of services and applications, to capture the computing resources of the computer on which the target of the attack is working and thus prevent the latter from processing legitimate transactions and requests. Examples of application attacks are attacks on half-open HTTP connections and with false HTTP connections.

One popular technique for detection and prevention of DDoS attacks is to identify computers from which the attacks perpetrated and block all traffic from those computers. One shortcoming of this technique is that incorrect identification of such computers, i.e., false positives, may result in blockage of traffic from legitimate computers. For example, false positives can disrupt the operation of an online store by preventing regular visitors from placing orders. Accordingly, there is a need for a network security system that can reduce false positives during detection of DoS and other attacks on a protected computer system.

SUMMARY

Disclosed are systems, methods and computer program products for reduction of false positives during detection of network attacks on a protected computer. In one example embodiment, the system comprises a proxy device configured to redirect and mirror traffic directed to the protected computer; a traffic sensor configured to collect statistical information about the mirrored traffic; a data collector configured to aggregate information collected by the traffic sensor and to generate traffic filtering rules based on the aggregated statistical information; a filtering center configured to, in parallel with collection of statistical information, filter redirected traffic based on the traffic filtering rules provided by the data collector; and a control module configured to collect and store statistical information about known network attacks and to correct traffic filtering rules for purpose of reducing false positives during detection of network attacks on the protected computer.

In another example embodiment, a computer implemented method for reducing false positives during detection of network attacks on a protected computer comprises: redirecting network traffic for the protected computer to a filtering center and mirroring said network traffic to a traffic sensor operating in parallel with the filtering center; filtering the redirected traffic by the filtering center using predefined filtering rules; in parallel with traffic filtering, analyzing the mirrored network traffic by the traffic sensor and collecting statistical information about the mirrored network traffic; updating traffic filtering rules based on the statistical information collected by the traffic sensor; and correcting the updated filtering rules based on statistical information about known network attacks for purpose of reducing false positives during detection of network attacks on the protected computer.

Yet in another example embodiment, a computer program product embedded in a non-transitory computer-readable storage medium, the computer-readable storage medium comprising computer-executable instructions for reducing false positives during detection of network attacks, on a protected computer, the medium includes instructions for: redirecting network traffic for the protected computer to a filtering center and mirroring said network traffic to a traffic sensor operating in parallel with the filtering center; filtering the redirected traffic by the filtering center using predefined filtering rules; in parallel with traffic filtering, analyzing the mirrored network traffic by the traffic sensor and collecting statistical information about the mirrored network traffic; updating traffic filtering rules based on the statistical information collected by the traffic sensor; and correcting the updated filtering rules based on statistical information about known network attacks for purpose of reducing false positives during detection of network attacks on the protected computer.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects of the invention may be employed, and this description is intended to include all such aspects of the invention and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

In the drawings.

DETAILED DESCRIPTION OF EXAMPLE EMBODIMENTS

Example embodiments of the present invention are described herein in the context of systems, methods and computer program products for reducing false positives during detection of network attacks, such as DDoS attacks, on a protected computer system. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
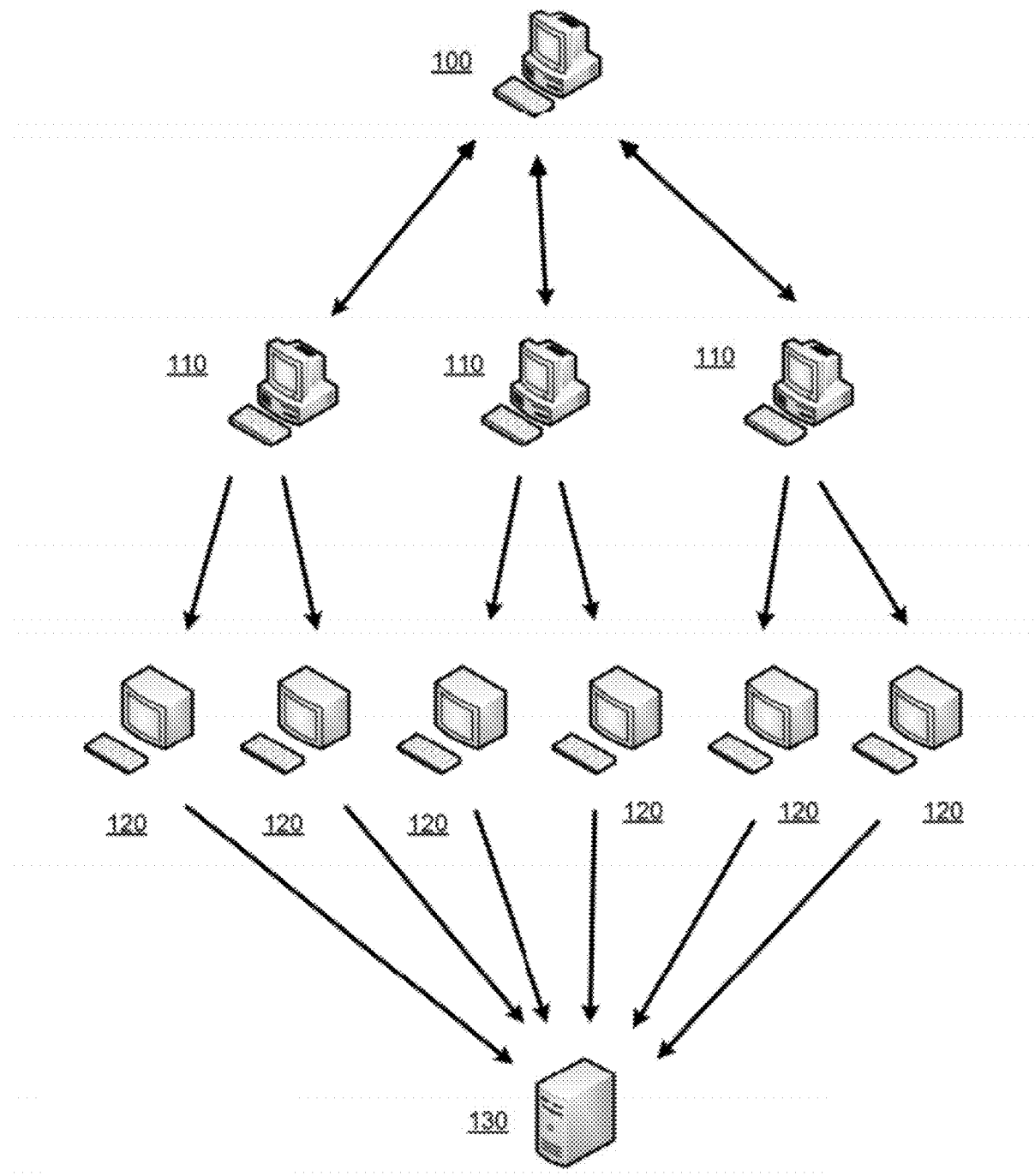
FIG. 1 illustrates a schematic diagram of a DDoS attack on a computer system.

DDoS attack is typically carried out using a zombie computer network known as botnet. A botnet is a network of computers infected with malware that makes it possible to remotely control infected computers without their users' knowledge. Programs that make it possible to carry out these actions are called bets. FIG. 1 is a sample diagram of a typical DDoS attack. A botnet owner sends from computer IOU signals to botnet controlled computers 110, each of which tracks a large number of computers 120 on which bots are installed. The use of botnet control computers 110 makes it much harder to identify the botnet owner's computer 100 and increases the potential size of the botnet to millions of machines. Then, the bots on computers 120 begin a DDoS attack on a service 130, which may be any Web-based service, such as an online store or file server. During a DDoS attack, service 130 is flooded with requests from computers 120 and, therefore, cannot handle real requests from legitimate customers and may even overload and crash.

Figure 2:
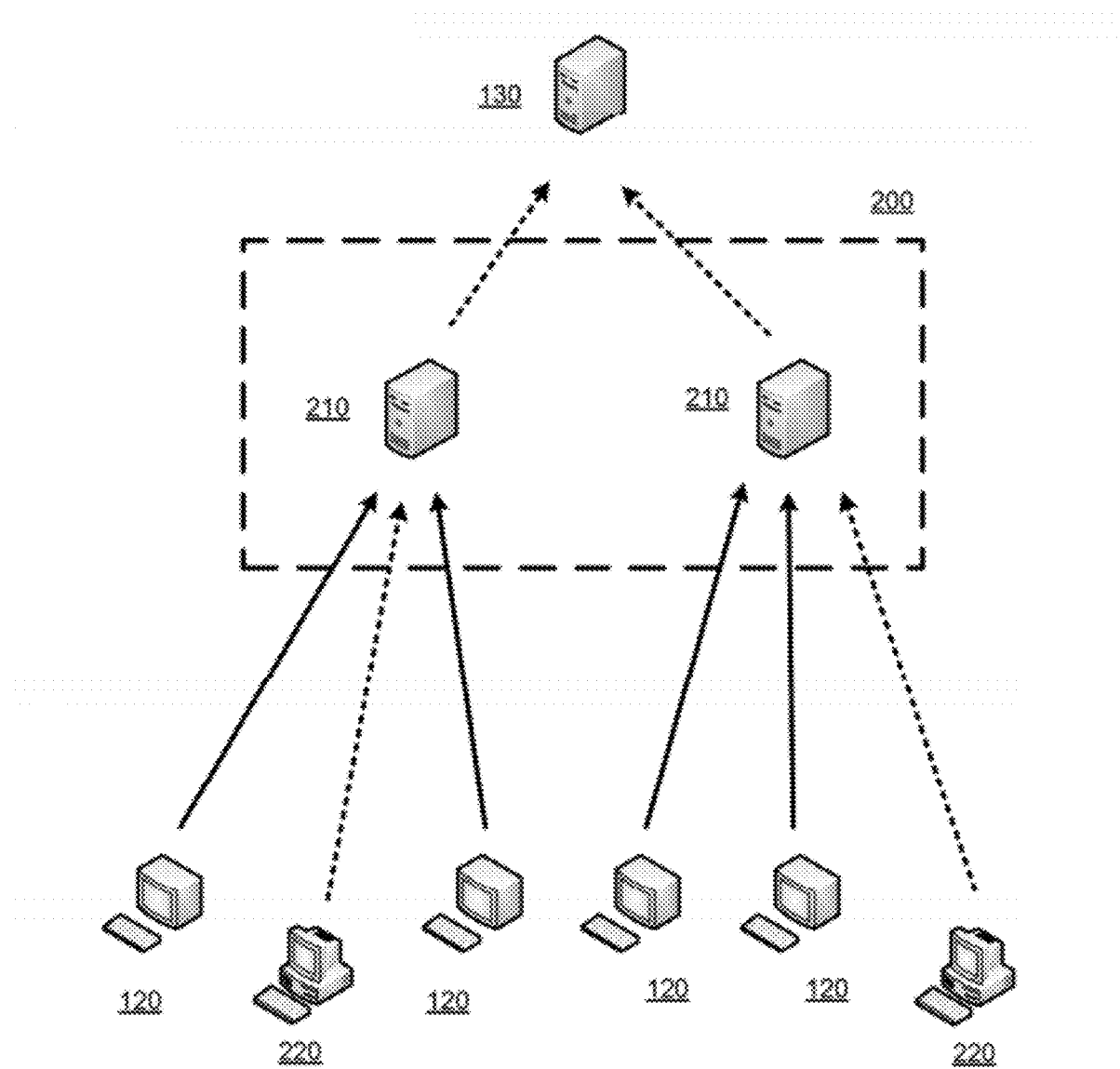
FIG. 2 illustrates a simplified schematic diagram of a network security system in accordance with one example embodiment.

FIG. 2 depicts a simplified diagram of an example embodiment of a network security system for protecting service 130 from DDoS and other attacks. System 200 includes one or more traffic filtering centers 210 for protecting service 130 hosted on a server. These centers filter traffic—both from computers 120, on which bots have been installed, and from ordinary users 220, who are trying to access service 130. To protect against a bandwidth attack, system 200 redirects network traffic to service 130 through filtering centers 210, which may be connected as close as possible to a broadband backbone network. In this way, traffic to service 130 is analyzed and filtered by filtering centers 210 without overloading a narrowband local access network (LAN) to which service 130 may be connected. In general, to protect service 130 against an application attack, the security system 200 may generate a model of the average statistical traffic to service 130, and then, during an attack, block parasite traffic on the basis of this model in accordance with one example embodiment. Hereinafter parasite traffic refers to traffic generated by bots on computers 120. Legitimate traffic is the data flow from ordinary users 220.

Figure 3:
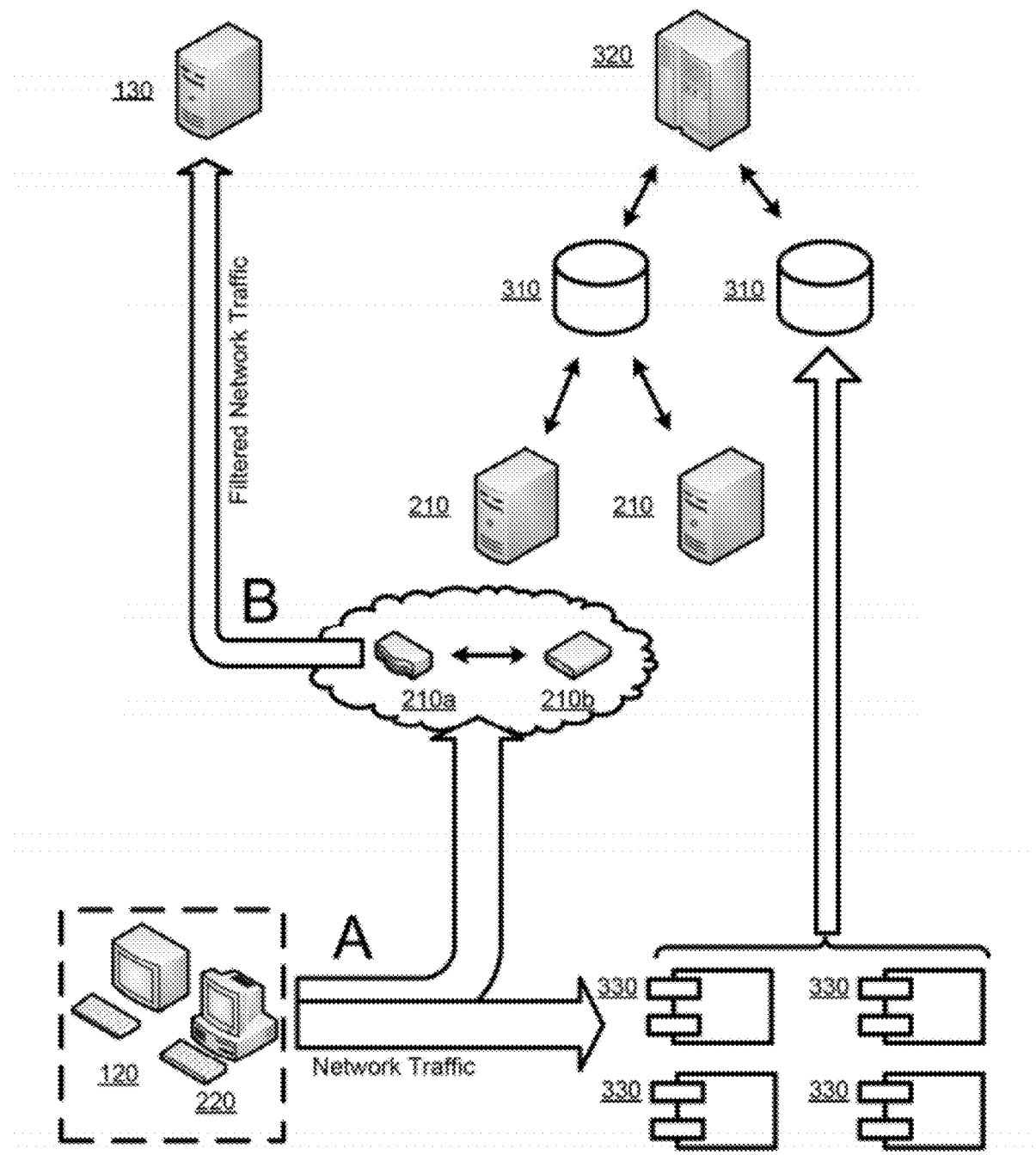
FIG. 3 illustrates a detailed schematic diagram of the network security system in accordance with one example embodiment.

FIG. 3 depicts a detailed diagram the network security system in accordance with one example embodiment of the invention. The system comprises a control module 320, data collectors 310, filtering centers 210 and traffic sensors 330. The system operates as follows: Traffic A to service 130 comes from computers 120 on which bots have been installed and from ordinary users 220. The traffic is redirected by a proxy server or router (not shown) to filtering centers 210 and at least a portion of the traffic (e.g., traffic on specific ports or the like) is mirrored via, e.g., packet replication, to traffic sensors 330. In this manner, traffic sensors 330 collect statistical information about transactions/queries to service 130. This allows parallel processing of the same network traffic by filtering centers 210 and traffic sensors 330. Sensors 330 then send statistical information about collected traffic to collectors 310 for further processing. As noted above, the redirected traffic flow goes to the filtering centers 210. In one example embodiment, data filtering centers 210 comprise of two devices—proxy service 210a and filtering router 210b. The task of proxy server 210a is to send filtered traffic B to service 130. The decision to carry traffic from a particular computer (it could be either computer 120 with a bot or an ordinary user 220) is made using filtering router 210b. The filtering rules are sent to filtering router 210b from collector 310. Components of the network security system will be discussed in more detail next.

Control module 320 monitors the operability of all the other modules (primarily collectors 310) by tracking their utilization. Control module 320 can track network utilization statistics (e.g., daily, weekly, monthly) and collect information about malicious activity on the Internet, which makes it possible to plot the geography of current attacks and store and collect statistics about known attacks (e.g., number of attacks, duration of attack, peak and average network load during the attack). This information may be used to generate the descriptive characteristics of each attack, for example: the number of botnets involved, time from the start of the attack, geography of the attack. On the basis of this information module 320 adjusts the filtering rules, which are stored in filtering profiles, which are used by the filtering centers 210. To accomplish this, control module 320 computes allowable amount of data traffic transmitted to the service 130, the allowable number of packets as a function of the protocol used, and other network parameter. Examples of various types of network parameters are presented in Table 1 below.

In one example embodiment, control module 320 also stores lists of black and white addresses (or, simply, blacklists and whitelists) to identify network devices traffic from which is either automatically blocked, as being originated from a known bot 120, or automatically forwarded to service 130, as being originated from a known legitimate user 220. Whitelists and blacklists can be generated manually by the system administrator or automatically on the basis of statistical and behavioral criteria collected by the control module 320.

Examples of the generation and revision of these lists are discussed, for example, in a commonly owned U.S. Pat. No. 7,640,589, which is incorporated by reference herein in its entirety. Behavioral criteria might include, for example, analysis of the number of queries and sessions from one IP address, the number of unconfirmed queries from one IP address the number of queries for data of the same type from one IP address, and the number of connections without continuation of information exchange, and other criteria.

Figure 4:
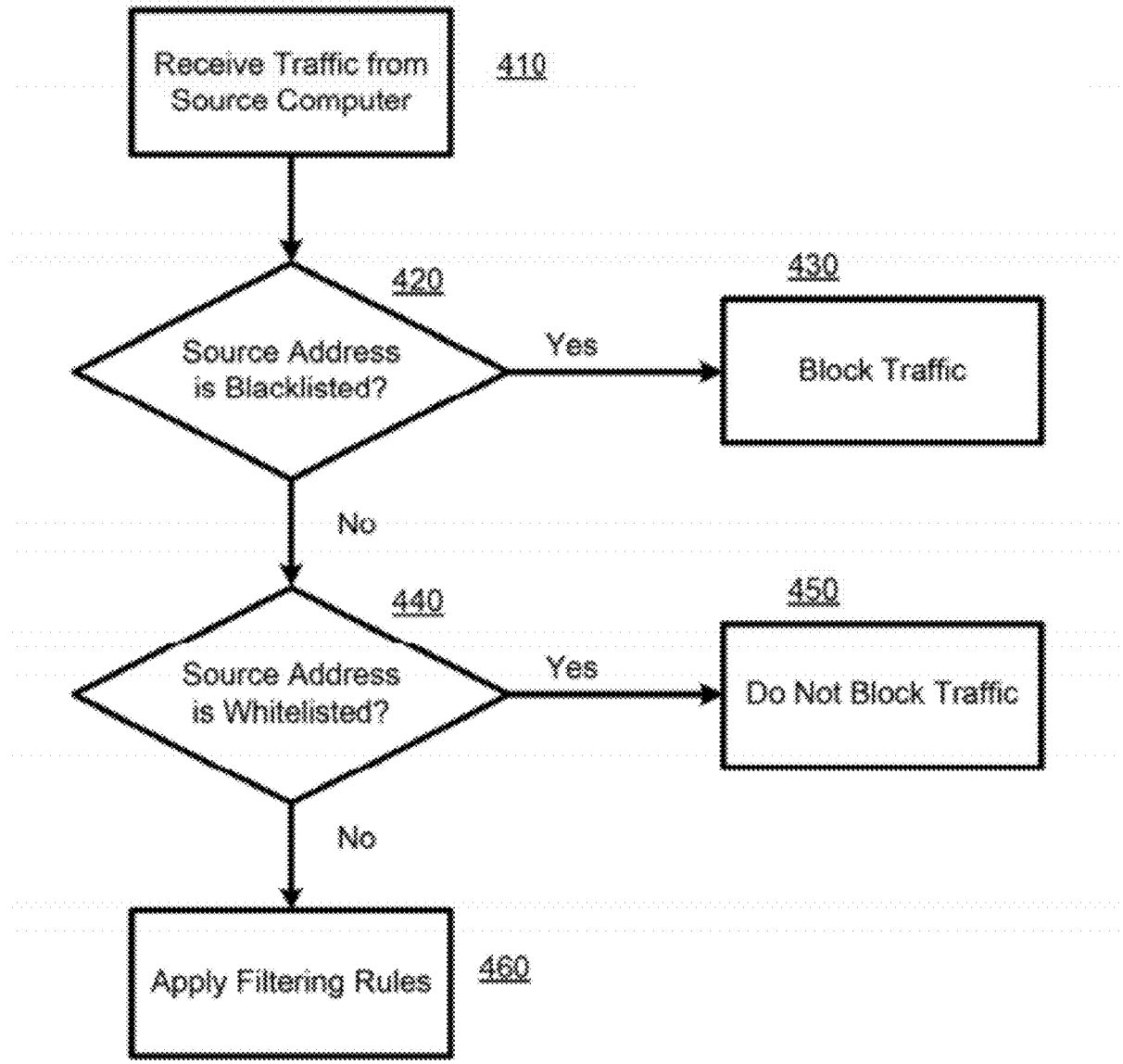
FIG. 4 illustrates an algorithm for filtering of network traffic in accordance with one example embodiment.

FIG. 4 illustrates one example embodiment of an algorithm implemented in filtering centers 210 for filtering network traffic to service 130 using blacklists and whitelists. At step 410, filtering centers 210 receive data traffic from a source computer 120 or 220. At step 420, filtering center 210 checks if the address of the source computer appears on a blacklist, which is provided by the control module 320. If the source address is blacklisted, the data traffic from that address is automatically blocked at step 430. If the source address is not blacklisted, filter center 210 checks, at step 430, if the source address appears on a whitelist. If the address is whitelisted, the data traffic from that address is automatically forwarded by the filtering center 210 (without any additional filtering) to the service 130 at step 450. However, if the source address is neither on the black or white list, filtering centers 210 applies filtering rule, at step 460, to determine if protected service 130 is under attack.

In one example embodiment, the network security system further includes traffic sensors 330 located in direct proximity to service 130. Traffic sensors 330 receive mirrored traffic (shown in FIG. 3 in the form of arrow A) and perform statistical processing of received data in order to aggregate traffic information and deliver it to collectors 310. Collectors 310 may perform additional statistical processing of the aggregated information about traffic directed to service 130. In addition, in one example embodiment, collectors 310 generalizes statistics for legitimate traffic (both from filtering centers 210 and from sensors 330) into one or more filtering rules, which may be organized in to filtering profiles, on the basis of which, in the event of an attack, filtering center 210 decides to filter parasite traffic. More specifically, the collectors 330 may generate a model of the average statistical traffic directed to service 130 and use this model to create various filtering rules for filtering centers 210.

In one example embodiment, filtering rules may be constructed with respect to traffic from a specific user or a group of users of a resource or service provided by service 130. Filtering rules evaluate the parameters of that traffic for conformance to normal parameters such as those listed in Table 1. It should be noted that the same dataset in Table 1 may be interpreted in different ways to construct different filtering rules. For example, filtering rules can compare values of various parameters with specified threshold (in different variations, ranging from the simple "if parameter X exceeds a preset value, then block traffic" to more complex). Examples of parameters, include but are not limited to:

The number of requests/sessions established from the same IP address;

The number of unconfirmed requests '200 OK' from the same IP address;

The number of requests of the same type of data from the same IP address;

The number of connections without continuing exchange of information, etc.

In one example embodiment, filtering center 210 is a separate server connected as close as possible to the broadband backbone network, such as a wide area network (WAN) or the like. In one example embodiment, filtering center 210 comprises a proxy server 210a and filtering router 210b. This division of functionality achieves higher efficiency of filtering center 210. Proxy server 210a redirects traffic to service 130. Filtering router 210b determines whether to allow particular traffic on the basis of data from collector 310 (i.e., removal of parasite traffic generated by bats). In this way, center 210 filters traffic A, leaving only legitimate queries from ordinary users 220 in the redirected traffic B.

Figure 5:
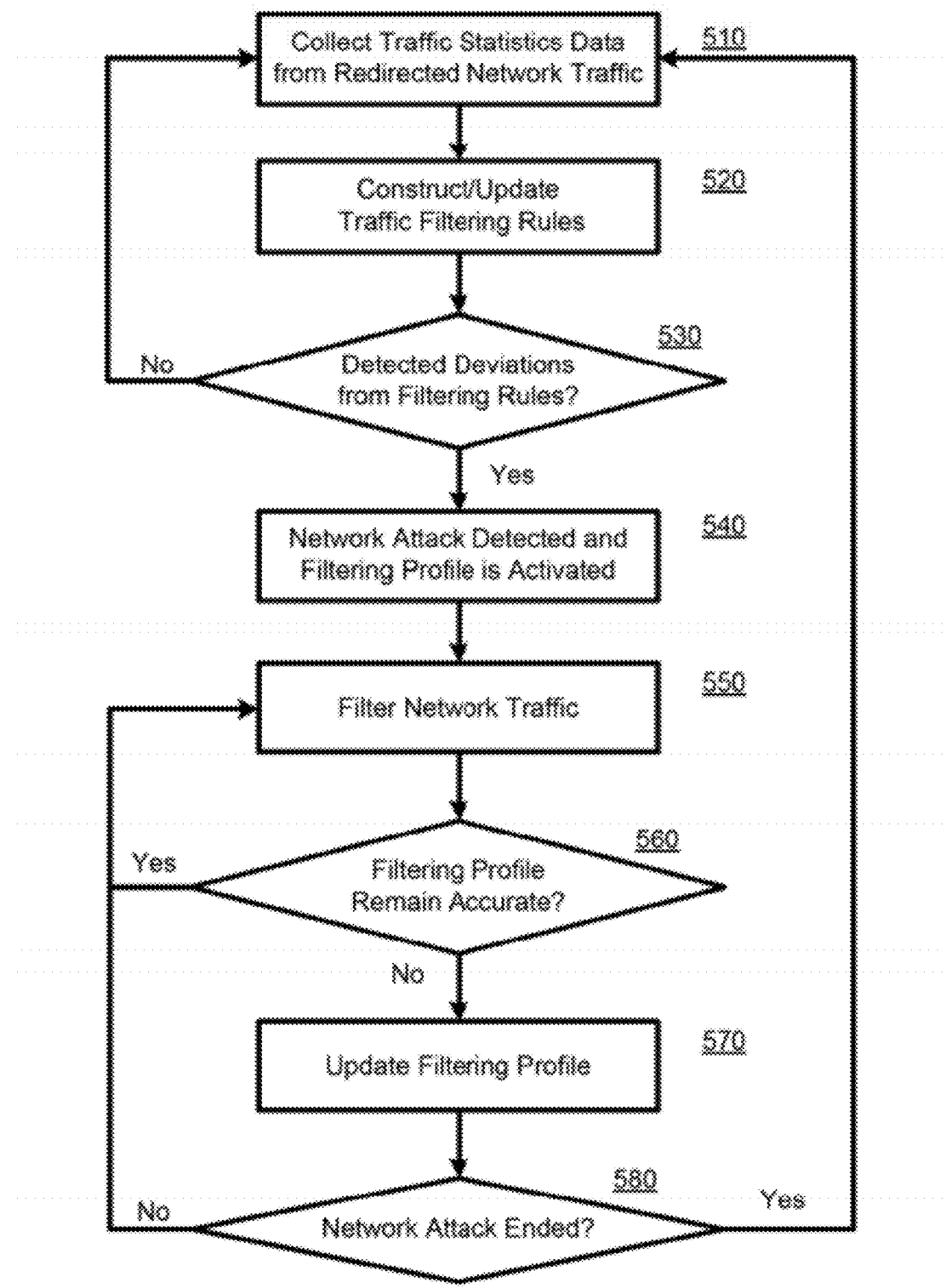
FIG. 5 illustrates an algorithm for operation of the network security system in accordance with one example embodiment.

FIG. 5 illustrates one example embodiment of an algorithm for operation of network security system of the present invention. Before any attack, the system redirects traffic from service 130 to traffic filters 210 that filter the redirected traffic and deliver it to service 130. At step 510, in parallel with filtering, the system mirrors network traffic to traffic sensors 330 that gather statistical information and track network anomalies from the redirected traffic. At step 520, the collected statistical information is used to create/update one or more filtering rules (or profiles) used by the filtering centers 210. If significant traffic deviations from the profile are detected at step 530, the system determines that a network attack, such as DDoS attack, on service 130 has been detected and begins filtering traffic at steps 540-550 based on the current filtering profile. At step 560, the system determines if the current filtering profile remains accurate (e.g., parasite traffic is being successfully filtered out without false positives). If the current filtering profile is no longer accurate, it is updated, at step 570, based on new statistical information provided by traffic sensors 330, information about known security attacks provided by control module 320, as well as black and white lists updated by control module 320 based on the information about known and new security threats. When the security attack has ended, at step 580, the algorithm returns to step 510.

Figure 6:
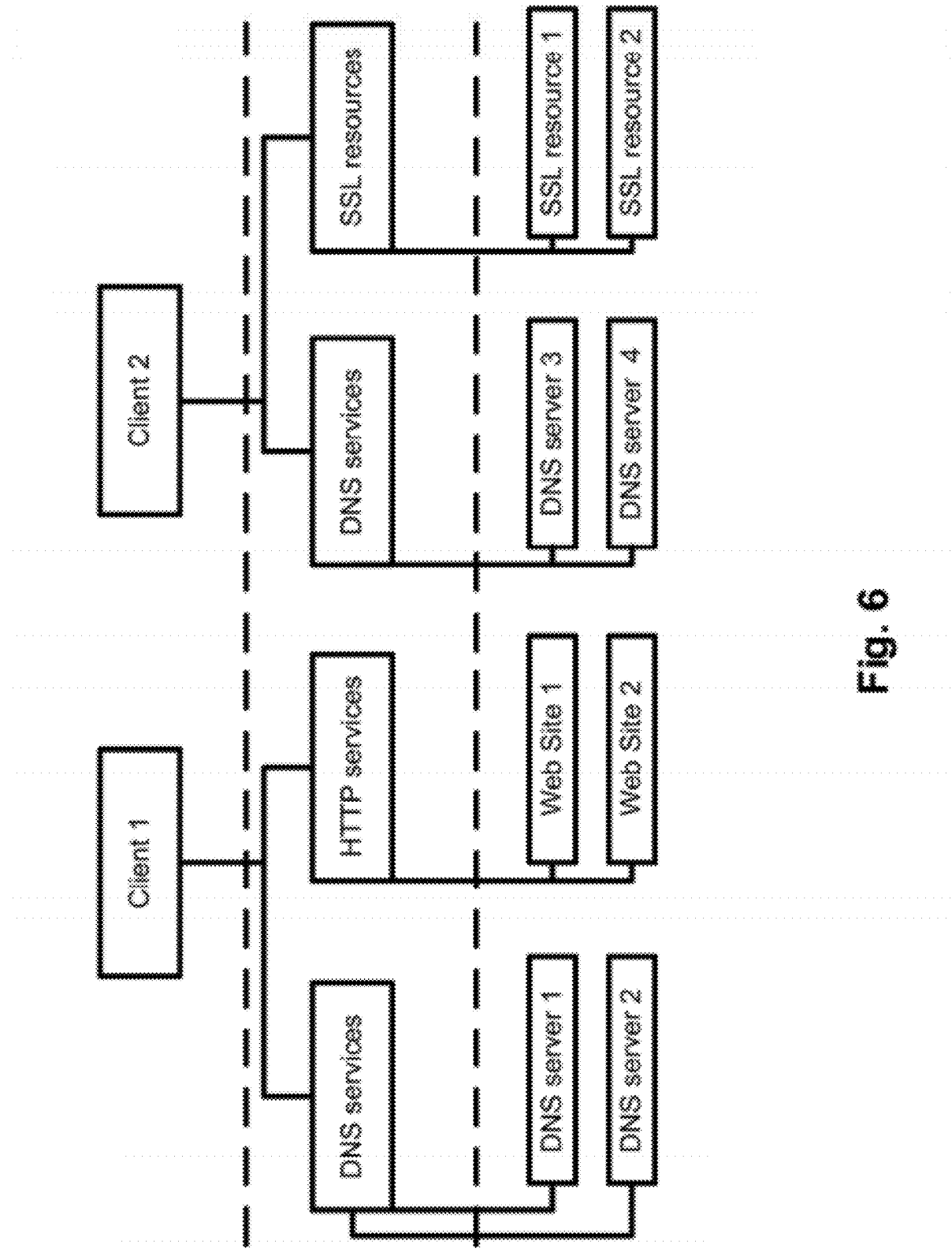
FIG. 6 illustrates a schematic diagram of a various levels of data aggregation by the network security system in accordance with one example embodiment.

In one example embodiment, different filtering rules may have different data aggregation levels that make it possible to analyze/filter input network traffic at different levels of granularity. FIG. 6 illustrates the use of different aggregation levels (in this example, aggregation levels 3 through 5), which makes it possible to track traffic starting from the selected client and to specific services. For example, one can track statistics not only for Client 1, but also for one of its HTTP services, such as Web site 1.

TABLE 1

| Aggregation level No. | Parameter Keys | Parameters |
|---|---|---|
| 1 | 1) IP address of the client of protected resource<br>2) IP address of the protected resource<br>3) Protocol/port (service)<br>4) Time mark | 1) Number of bites received<br>2) Number of bites sent<br>3) Number of packets received<br>4) Number of packets sent<br>5) Number of packets received with a single SYN flag (for TCP protocol) |
| 2 | 1) Country code for the IP address of the client of the protected resource<br>2) IP address of the protected resource<br>3) Protocol/port (service)<br>4) Time mark | 1) Number of bites received<br>2) Number of bites sent<br>3) Number of packets received<br>4) Number of packets sent<br>5) Number of packets received with a single SYN flag (for TCP protocol)<br>6) Number of the unique IP addresses of clients of the protected resource |
| 3 | 1) IP addresses of the protected resource<br>2) Protocol/port (service)<br>3) Time mark | 1) Number of bites received<br>2) Number of bites sent<br>3) Number of packets received<br>4) Number of packets sent<br>5) Number of packets received with a single SYN flag (for |

TABLE 1-continued

| Aggregation level No. | Parameter Keys | Parameters |
|---|---|---|
| | | TCP protocol) |
| | | 6) Number of the unique IP addresses of clients of the protected resource |
| 4 | 1) Resource group identifier<br>2) Protocol/port (service)<br>3) Time mark | 1) Number of bites received<br>2) Number of bites sent<br>3) Number of packets received<br>4) Number of packets sent<br>5) Number of packets received with a single SYN flag (for TCP protocol)<br>6) Number of the unique IP addresses of clients of the protected resource |
| 5 | 1) Client identifier<br>2) Protocol/port (service)<br>3) Time mark | 1) Number of bites received<br>2) Number of bites sent<br>3) Number of packets received<br>4) Number of packets sent<br>5) Number of packets received with a single SYN flag (for TCP protocol)<br>6) Number of the unique IP addresses of clients of the protected resource |

In another example embodiment, anomalies, in a form of significant deviations from the predefined filtering profile, may be detected using an anomaly detection profile. The anomaly profile may be constructed with respect to traffic directed to service 130. The anomaly profile evaluates the statistical information (e.g., parameters in Table 1) about the traffic directed to the protected service 130 for conformance to established threshold values. The anomaly detection profile may represent a set of threshold values for a certain value S that describe normal traffic for one of the aggregation levels (e.g., client or service). A threshold value may be assigned for each hour of the day and for a certain day of the week to eliminate possible false positives. S can be any of the fixed values, e.g., the total number of incoming packets or the number of unique user IP addresses. For example, if the filtering rule indicates that between hours of 2 PM and 4 PM the protected system receives about 200,000 transaction requests from computers located in the North America, and suddenly the number of requests doubles, the anomaly detection profile would detect this anomaly and activate an appropriate filtering rule for blocking excess and/or atypical traffic to service 130.

Figure 7:
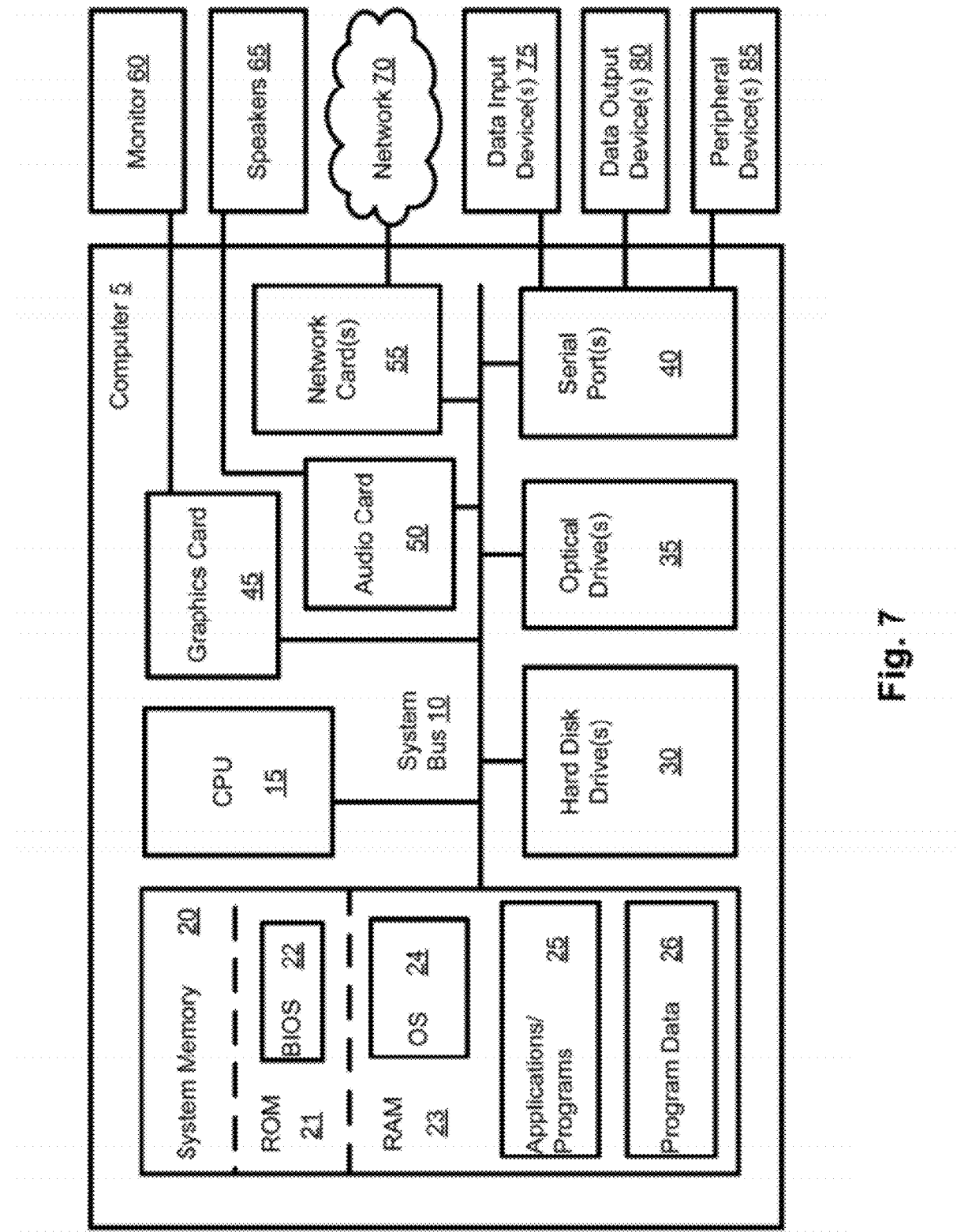
FIG. 7 illustrates a schematic diagram of a computer system for implementing the network security system in accordance with one example embodiment.

FIG. 7 depicts one example embodiment of a computer system 5, such as a network server, suitable for implementing the network security system of the present invention, as well as other computing devices that may be utilizing services of the security system, including but not limited to personal computers and servers running security applications, mobile communication devices, network servers, and other devices. As shown in FIG. 7, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional® or other type of operating system, that is responsible for management and coordination of processes and allocation and sharing of hardware resources in computer system 5. System memory 20 also stores applications and programs 25, such as security applications, that are running on the computer 5. System memory 20 also stores various runtime data 26 used by programs 25.

Computer system 5 may further include hard disk drive(s) 30, such as 1 terabyte SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the implementations of the invention are shown and described herein. It will be appreciated that in the development of any such actual implementation, numerous implementation-specific decisions must be made in order to achieve the developer's specific goals, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A system for reduction of false positives during detection of network attacks on a protected computer, the system comprising:
    a proxy device configured to receive network traffic directed to a protected computer, redirect the received traffic to a filtering center and mirror the received traffic to a traffic sensor;
    the traffic sensor configured to collect statistical information about the mirrored traffic;
    a data collector configured to aggregate information collected by the traffic sensor and generate, based on the aggregated information, traffic filtering rules for detecting network attacks on the protected computer;
    the filtering center configured to, in parallel with collection of the statistical information from the mirrored traffic by the traffic sensor and based on the traffic filtering rules provided by the data collector, detect, in the redirected traffic, network attacks on the protected computer and filter out from the redirected traffic network traffic associated with the detected network attacks; and
    a control module configured to collect and store statistical information about known network attacks and to correct the traffic filtering rules used by the filtering center for purpose of reducing false positives during detection of network attacks on the protected computer.

2. The system of claim 1, wherein the data collector generates a model of the average statistical traffic directed to the protected computer based on the aggregated information and generates traffic filtering rules based on the generated statistical model.

3. The system of claim 1, wherein the statistical information about known network attacks includes:
    statistics of the average and peak network load during an attack;
    information about malicious activities by botnets in the Internet;
    number of botnets participating in the network attack;
    time of the beginning of the network attack;
    duration of the network attack; and
    geography of the network attack.

4. The system of claim 1, wherein the control module uses white and black lists of IP addresses to update traffic filtering rules.

5. The system of claim 4, wherein the white and black lists of IP addresses are created based on behavioral criteria, including:
    number of queries and sessions from one IP address;
    number of unconfirmed queries from one IP address;
    number of queries for data of the same type from one IP address; and
    number of connections without continuation of information exchange.

6. The system of claim 1, wherein the data collector is configured to aggregate statistical information about network traffic at different level of granularity and generate different filtering rules for filtering network traffic at different levels of granularity.

7. The system of claim 1, wherein filtering centers are located in the proximity to broadband backbone network associated with the protected computer.

8. The system of claim 1, wherein traffic sensors are located in the proximity to the protected computer.

9. A computer implemented method for reducing false positives during detection of network attacks on a protected computer, the method comprising:
    receiving at a proxy device network traffic directed to the protected computer;
    redirecting by the proxy device the received network traffic to a filtering center;
    mirroring by the proxy device the received network traffic to a traffic sensor;
    analyzing the mirrored network traffic by the traffic sensor and collecting statistical information about the mirrored network traffic;
    aggregating information collected by the traffic sensor and generating, based on the aggregated information, traffic filtering rules for detecting network attacks on the protected computer;
    filtering, in parallel with collection of the statistical information from the mirrored traffic by the traffic sensor, the redirected traffic by the filtering center using the generated filtering rules; and
    correcting the filtering rules by a control module based on statistical information about known network attacks for purpose of reducing false positives during detection of network attacks on the protected computer.

10. The method of claim 9, wherein collecting statistical information about the mirrored network traffic further includes:
    generating a model of the average statistical traffic directed to the protected computer based on the collected statistical information; and
    generating traffic filtering rules based on the generated statistical model.

11. The method of claim 9, wherein the statistical information about known network attacks includes:
    statistics of the average and peak network load during an attack;
    information about malicious activities by botnets in the Internet;
    number of botnets participating in the network attack;
    time of the beginning of the network attack;
    duration of the network attack; and
    geography of the network attack.

12. The method of claim 9, wherein correcting filtering rules by a control module further comprises: using white and black lists of IP addresses to correct traffic filtering rules.

13. The method of claim 12, further comprising generating white and black lists of IP addresses based on behavioral criteria, including:
- number of queries and sessions from one IP address;
- number of unconfirmed queries from one IP address;
- number of queries for data of the same type from one IP address; and
- number of connections without continuation of information exchange.

14. The method of claim 9, wherein collecting statistical information further comprises:
- collecting statistical information about traffic at different level of granularity; and
- generating different filtering rules for filtering traffic at different levels of granularity.

15. The method of claim 9, further comprising positioning filtering centers in the proximity to a broadband backbone network associated with the protected computer.

16. The method of claim 9, further comprising positioning traffic sensors in the proximity to the protected computer.

17. A computer program product embedded in a non-transitory computer-readable storage medium, the computer-readable storage medium comprising computer-executable instructions for reducing false positives during detection of network attacks on a protected computer, the medium includes instructions for:
- receiving at a proxy device network traffic directed to the protected computer;
- redirecting by the proxy device the received network traffic to a filtering center;
- mirroring by the proxy device the received network traffic to a traffic sensor;
- analyzing the mirrored network traffic by the traffic sensor and collecting statistical information about the mirrored network traffic;
- aggregating information collected by the traffic sensor and generating, based on the aggregated information, traffic filtering rules for detecting network attacks on the protected computer;
- filtering, in parallel with collection of the statistical information from the mirrored traffic by the traffic sensor, the redirected traffic by the filtering center using the generated filtering rules; and
- correcting the filtering rules by a control module based on statistical information about known network attacks for purpose of reducing false positives during detection of network attacks on the protected computer.

18. The computer program product of claim 17, wherein the statistical information about known network attacks includes:
- statistics of the average and peak network load during an attack;
- information about malicious activities by botnets in the Internet;
- number of botnets participating in the network attack;
- time of the beginning of the network attack;
- duration of the network attack; and
- geography of the network attack.

19. The computer program product of claim 17, wherein instructions for correcting filtering rules by a control module further comprise instructions for using white and black lists of IP addresses to correct traffic filtering rules.

20. The computer program product of claim 17, wherein instructions for collecting statistical information further comprise instructions for:
- collecting statistical information about traffic at different level of granularity; and
- generating different filtering rules for filtering traffic at different levels of granularity.

* * * * *